US010275426B1

(12) United States Patent
Cao et al.

(10) Patent No.: US 10,275,426 B1
(45) Date of Patent: Apr. 30, 2019

(54) DYNAMIC KERNING PAIR REDUCTION FOR DIGITAL FONT RENDERING

(71) Applicant: Amazon Technologies, Inc., Seattle, WA (US)

(72) Inventors: Yushu Cao, Seattle, WA (US); Sivarangini Ragavan, Redmond, WA (US); Michael Patrick Bacus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 14/860,738

(22) Filed: Sep. 22, 2015

(51) Int. Cl.
*G06T 11/00* (2006.01)
*G06F 17/21* (2006.01)
*G09G 5/26* (2006.01)

(52) U.S. Cl.
CPC ............ *G06F 17/214* (2013.01); *G09G 5/26* (2013.01); *G09G 2340/0471* (2013.01); *G09G 2340/0478* (2013.01); *G09G 2340/14* (2013.01); *G09G 2380/14* (2013.01)

(58) Field of Classification Search
None
See application file for complete search history.

(56) References Cited

U.S. PATENT DOCUMENTS

| | | | | |
|---|---|---|---|---|
| 5,404,436 A * | 4/1995 | Hamilton | ................ | G06K 15/02 345/26 |
| 5,623,593 A * | 4/1997 | Spells, III | ............... | G06K 15/02 345/472 |
| 5,724,596 A * | 3/1998 | Lathrop | ................. | G06F 17/214 715/244 |
| 5,768,490 A * | 6/1998 | Hersch | .................... | B41B 19/00 345/467 |
| 5,926,189 A * | 7/1999 | Beaman | ................ | G06F 17/214 345/467 |
| 5,937,420 A * | 8/1999 | Karow | .................. | G06F 17/214 345/467 |
| 6,031,622 A * | 2/2000 | Ristow | ................... | G06K 15/02 358/1.11 |
| 6,288,726 B1 * | 9/2001 | Ballard | ................. | G06F 17/214 345/468 |
| 6,512,522 B1 * | 1/2003 | Miller | ..................... | G06T 13/20 345/474 |
| 6,829,748 B1 * | 12/2004 | Browne | ................ | G06F 17/214 345/468 |
| 6,912,707 B1 * | 6/2005 | Fontes, Jr. | .............. | G06T 19/20 715/762 |
| 7,064,757 B1 * | 6/2006 | Opstad | .................. | G06F 17/214 345/467 |

(Continued)

*Primary Examiner* — Anh-Tuan V Nguyen
(74) *Attorney, Agent, or Firm* — Eversheds Sutherland (US) LLP

(57) ABSTRACT

Systems, methods, and computer-readable media are disclosed for dynamic kerning pair reduction for digital font rendering. Example methods may include receiving a first font file comprising glyph data and a first set of kerning pairs, determining a first kerning pair of the first set of kerning pairs that comprises a kerning adjustment value below a kerning adjustment threshold, removing the first kerning pair from the first set of kerning pairs to generate a second set of kerning pairs, and generating a second font file comprising the glyph data and the second set of kerning pairs.

20 Claims, 6 Drawing Sheets

(56) References Cited

U.S. PATENT DOCUMENTS

| | | | |
|---|---|---|---|
| 8,306,356 B1* | 11/2012 | Bever | G06K 9/723 382/275 |
| 8,589,399 B1* | 11/2013 | Lee | G06F 17/30616 707/737 |
| 8,965,849 B1* | 2/2015 | Goo | G06F 17/30327 707/634 |
| 2002/0196971 A1* | 12/2002 | Miyamoto | G06T 9/005 382/166 |
| 2003/0037042 A1* | 2/2003 | Kametani | G06F 17/30952 |
| 2003/0043151 A1* | 3/2003 | Choi | G06F 17/214 345/467 |
| 2003/0055851 A1* | 3/2003 | Williamson | G06F 17/211 715/251 |
| 2006/0171588 A1* | 8/2006 | Chellapilla | G06K 9/6828 382/185 |
| 2006/0256116 A1* | 11/2006 | Burago | G06T 11/60 345/467 |
| 2007/0250497 A1* | 10/2007 | Mansfield | G06F 17/30731 |
| 2008/0235260 A1* | 9/2008 | Han | G06F 17/2247 |
| 2009/0300015 A1* | 12/2009 | Kazan | H03M 7/30 |
| 2010/0127900 A1* | 5/2010 | Schneider | H03M 7/3088 341/51 |
| 2011/0090230 A1* | 4/2011 | Bacus | G06F 17/214 345/467 |
| 2013/0051690 A1* | 2/2013 | Kuettel | G06F 17/214 382/232 |
| 2013/0127703 A1* | 5/2013 | Wendt | G06F 3/04847 345/156 |
| 2013/0159300 A1* | 6/2013 | Gallivan | G06F 17/30616 707/730 |
| 2013/0174022 A1* | 7/2013 | Xia | G06F 17/214 715/244 |
| 2013/0278625 A1* | 10/2013 | Obata | G06F 3/013 345/619 |
| 2014/0111522 A1* | 4/2014 | Refstrup | G06T 11/203 345/468 |
| 2014/0281916 A1* | 9/2014 | Kaasila | G06F 17/214 715/234 |
| 2015/0012396 A1* | 1/2015 | Puerini | G06Q 10/0875 705/28 |
| 2015/0234899 A1* | 8/2015 | Lightner | G06F 17/30501 707/693 |
| 2015/0310082 A1* | 10/2015 | Han | G06F 17/30592 707/602 |
| 2016/0026888 A1* | 1/2016 | Mankovskii | G06K 9/3241 382/103 |
| 2016/0239499 A1* | 8/2016 | Nguyen | G06F 17/3071 |
| 2018/0018305 A1* | 1/2018 | Hassan | G06F 17/212 |
| 2018/0054215 A1* | 2/2018 | Yamagiwa | H03M 7/42 |

* cited by examiner

| Kerning Pair ID | Glyph ID 1 | Glyph ID 2 | Horiz. Adj. | Vert. Adj. | Diag. 1 Adj. | Diag. 2 Adj. | Diag. 3 Adj. | Diag. 4 Adj. | Language Frequency | Content Frequency |
|---|---|---|---|---|---|---|---|---|---|---|
| 1 | 60 | 23 | -27; 0 | | 1; 0 | | | | 70 | 59 |
| 2 | 33 | 7 | 55; 0 | | | -6; 0 | | | 19 | 44 |
| ... | ... | ... | ... | ... | ... | ... | ... | ... | ... | ... |
| 43,699 | 129 | 3 | | | | | 0; 45 | 20; 0 | 20 | 7 |
| ... | ... | ... | ... | ... | ... | ... | ... | ... | ... | ... |
| 78,063 | 4 | 99 | | 44; 0 | | | | | 1 | 40 |
| ... | ... | ... | ... | ... | ... | ... | ... | ... | ... | ... |
| 86,786 | 60 | 23 | -20; 1 | | | | | | 70 | 59 |
| ... | ... | ... | ... | ... | ... | ... | ... | ... | ... | ... |
| 165,006 | 180 | 39 | | 75; 0 | | | | | 68 | 17 |

Glyph Positioning Data 510

520 Kerning Pair ID
530 Glyph ID 1
540 Glyph ID 2
550 (row 43,699)
560 (row 78,063)
570 (row 86,786)
580 (row 165,006)

User Device 500

FIG. 5

DYNAMIC KERNING PAIR REDUCTION FOR DIGITAL FONT RENDERING

BACKGROUND

Digital content, such as text content, may be rendered on electronic device displays. Text content may be rendered in certain fonts or typefaces. In order to determine how to render text in a certain font or typeface, a font file may be referenced. The font file may include font-specific positional adjustments for certain characters, such as specific inter-character spacing between two characters, or other positional adjustment exceptions. In some instances, font files may include hundreds of thousands of font-specific positional adjustments that are non-uniform or exceptions to default positioning of characters. Before rendering text content in the font, a rendering device may systematically check each positional adjustment to determine whether specific positional adjustments are needed. As a result, rendering of text in certain fonts may be relatively slow and may impact performance.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 5 is a schematic illustration of example glyph positioning data in accordance with one or more example embodiments of the disclosure.

DETAILED DESCRIPTION

Overview

Figure 1:
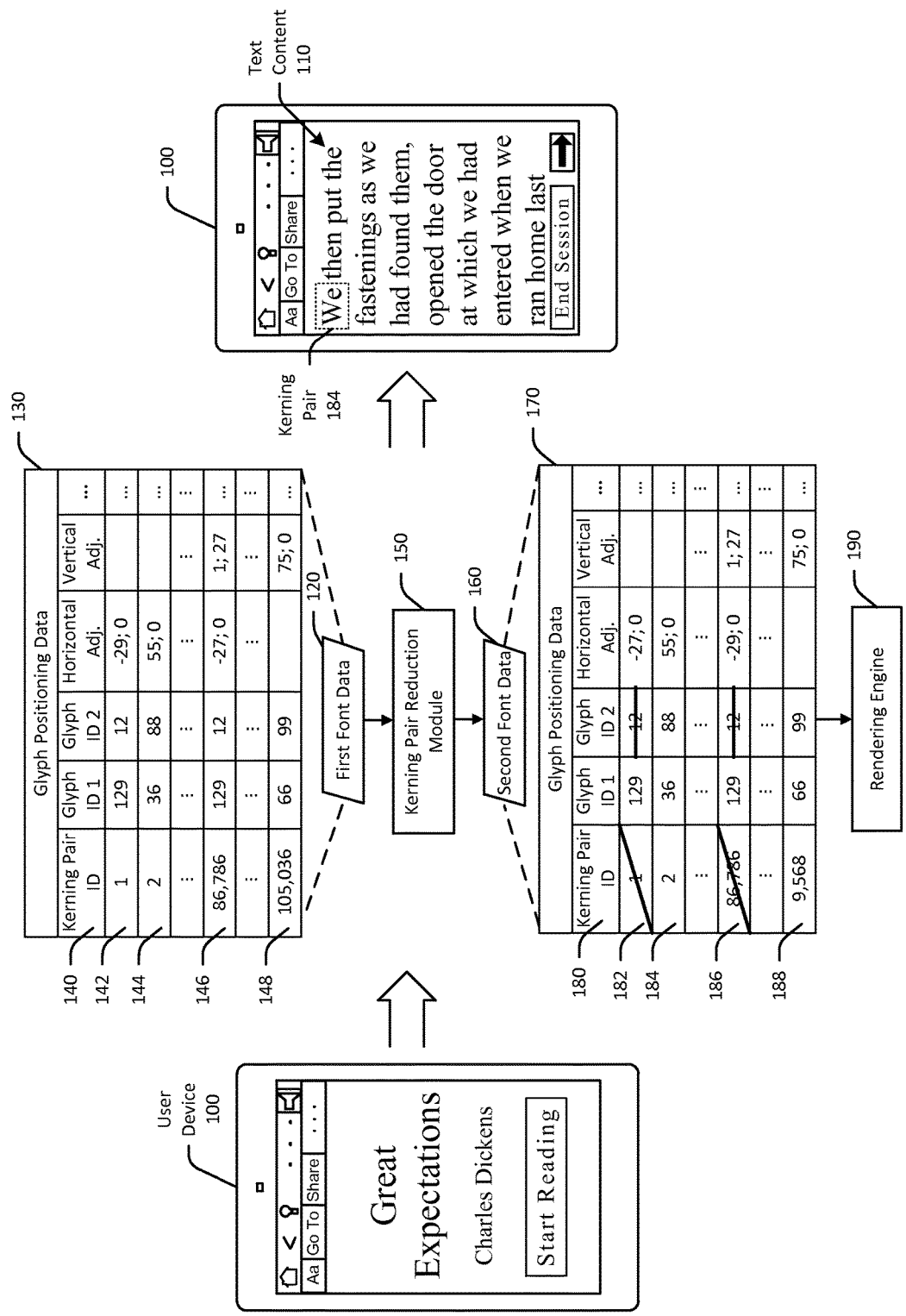
FIG. 1 is a schematic hybrid system and process diagram illustrating dynamic kerning pair reduction for digital font rendering in accordance with one or more example embodiments of the disclosure.

This disclosure relates to, among other things, systems, methods, computer-readable media, techniques, and methodologies for dynamic kerning pair reduction for digital font rendering. Users may consume digital content, such as text content, on electronic devices, such as electronic readers (also referred to herein as "e-readers"). Digital content may include, without limitation, electronic books ("e-books") or other electronic publications (e.g., magazines, comic books, Manga books, social media news feeds, documents, websites, other Internet content, etc.), or the like. While example embodiments of the disclosure may be described in the context of e-books and/or electronic reader ("e-reader") devices, it should be appreciated that the disclosure is more broadly applicable to any form of digital content consumable on any suitable user device including, without limitation, a smartphone, a tablet, a wearable device, a content streaming device, a digital media consumption device, a video game console, a set-top box, or any other suitable device.

Embodiments of the disclosure may dynamically reduce an amount of kerning pairs associated with fonts, such that text can be rendered in a reduced amount of time, and, in some instances, with reduced computing resources, resulting in improved computing performance and user experience. Fonts may be associated with a number of positional adjustments, such as kerning pairs, which may be used to render glyphs on an electronic display in the font. However, certain small positional adjustments may be unnoticeable by a user upon rendering. In addition, some positional adjustments may be associated with pairs of glyphs or pairs of characters that are rarely found in a certain language and/or in the text content. Certain embodiments of the disclosure may reduce an amount of kerning pairs associated with a font. Because of the reduced amount of kerning pairs, a rendering engine may render text content in the font in a reduced length of time since the amount of kerning pairs that the rendering engine must consider is reduced. As a result, text may be rendered quicker and lag time experienced by a user may therefore be reduced. Further, embodiments of the disclosure may reduce the amount of kerning pairs by removing kerning pairs that occur relatively less frequently than other kerning pairs in a language generally and/or in the specific text content, as well as by removing kerning pairs that may result in an imperceptible positional adjustment by a user. The user experience and/or readability of the text content may therefore be preserved.

The systems and methods described herein may facilitate kerning pair reduction for digital font rendering, in any language and/or font. In certain embodiments, the systems and methods described herein may reduce kerning pairs based at least in part on redundancy, frequency of occurrence in a corpus of literature for a particular language, frequency of occurrence in particular content, and/or kerning pairs with positional adjustment values below a threshold amount that may be imperceptible to the user. Font files generated by embodiments of the disclosure may be relatively smaller in size, which may result in faster downloads, faster accessing of content, faster rendering, and increased memory on devices for content.

Referring to FIG. 1, a user device 100 in accordance with one or more embodiments of the disclosure is depicted. A user may initiate rendering of text content 110 using a user interface of the user device 100. For example, the user may tap a "Start Reading" button presented at the user device 100. The user device 100 may render the text content 110. To render the text content 110, the user device 100 may access first font data 120, which may include a first font file, for example, and may be data associated with the text content 110 that is to be rendered. The first font data 120 may be stored locally or retrieved remotely and may be associated with the text content 110.

The first font data 120 may include font information, glyph information, positioning information, and the like. Fonts may include a set of one or more glyphs that may be a part of the glyph information or glyph data. A glyph may be a symbol representative of a readable character that conveys information to a reader. More specifically, a glyph may be indicative of an individual letter or character of an alphabet, a number, a symbol, a punctuation mark, and/or another symbol. Fonts may be indicated by one or more of a particular size, weight, and/or style of a typeface. For example, Times New Roman may be considered a typeface, and Times New Roman—Italics may be considered a font. "Font" and "typeface" may be used interchangeably herein. Fonts may be vector fonts, such that different sizes of the font or typeface may be generated from a single vector font.

The first font data 120 may include glyph data and positional adjustment data. The glyph data may include a set of one or more glyphs for use in rendering text in the font associated with the first font data 120. The positional adjustment data may include information related to default glyph positioning and exceptional glyph positioning, such as kerning information or kerning data. For example, in FIG. 1, the first font data 120 may include glyph positioning data 130. The glyph positioning data 130 may be stored and/or accessed in the form of one or more associated tables. For example, the glyph positioning data 130 may include a glyph positioning table in some font files.

The glyph positioning data 130 may include default glyph positioning, as well as exceptions to the default positioning. Default glyph positioning may be information associated with default origins, advance values, bearing values, and the like for one or more glyphs associated with the font. Exceptional glyph positioning may be information associated with glyph positioning for certain instances. For example, while a glyph may have a default origin such that a default inter-character spacing is achieved, for certain pairs of glyphs, inter-character spacing may be adjusted to a value other than the default value, so as to improve readability. An example of exceptional glyph positioning may be kerning adjustments. Kerning adjustments may be positional adjustments for one or both of a pair of glyphs in instances where the pair of glyphs are to be rendered in adjacent positions. Kerning adjustments may be associated with one or more of the pair of glyphs (e.g., adjustments may be for the glyph occurring "first" or first to be rendered, or for the glyph occurring "second" or second to be rendered, or both). Kerning adjustments may include horizontal positional adjustments, vertical positional adjustments, or diagonal positional adjustments with respect to a baseline, and can be positive or negative, resulting in, for example, 8 possible positional adjustments for some fonts. Other fonts may have more or less possible positional adjustments. A baseline may be a virtual line upon which most glyphs "rest" or "sit" and for which glyphs with descending portions, such as "g" or "y" extend below. Kerning adjustments for horizontal positioning adjustments may be indicated by numerical values and may represent an addition or subtraction to a default advance value of a glyph.

In FIG. 1, the glyph positioning data 130 of the first font data 120 may include a number of kerning pairs that may be associated with kerning pair identifiers 140. The kerning pair identifiers 140 may be sequential numerals or may be any other suitable alphanumeric or other identifier. One or more of the kerning pairs may be associated with glyph identifiers that indicate the glyphs included in each kerning pair. For example, a first kerning pair 142 may include a first glyph with a glyph identifier of "129" and a second glyph with a glyph identifier of "12." The first glyph may correspond to a glyph that is to be rendered first, and the second glyph may correspond to the glyph that is to be rendered second. In other embodiments, the second glyph may be rendered before the first glyph. The kerning pairs may be associated with one or more positional adjustments. For example, the first kerning pair 142 may be associated with a horizontal adjustment value of "−29; 0," which may indicate that the first glyph, when the first kerning pair 142 is rendered, is to be moved in the negative horizontal direction at rendering, while the second glyph retains a default horizontal positioning. The amount of the adjustment may be in any suitable design units, such as pixels-per-em (PPEM), and may be a combination of point size and device resolution. In some embodiments, the second glyph may have a positional adjustment, while the first glyph retains default positioning, or both glyphs may have positional adjustments.

In another example, a second kerning pair 144 may have a kerning pair identifier of "2," indicating that the second kerning pair 144 is the $2^{nd}$ kerning pair associated with the font of the first font data 120. The second kerning pair 144 may be associated with the respective glyphs associated with glyph identifiers "36" and "88." The second kerning pair 144 may have a horizontal adjustment value of "55; 0," indicating that the first glyph "36" of the second kerning pair 144 is to be adjusted positive 55 PPEM in the horizontal direction.

The glyph positioning data 134 may include a third kerning pair 146 with a kerning pair identifier of "86,786," which may indicate that the second kerning pair 144 is the $86,786^{th}$ kerning pair associated with the font of the first font data 120. The second kerning pair 144 may also, like the first kerning pair 142, include glyphs associated with glyph identifiers "129" and "88." The third kerning pair 146, however, may have different positional adjustments than the first kerning pair 142 in some instances. For example, kerning pairs may be automatically generated by software tools that may process fonts. The automated process may result in many kerning pairs being formed that may be redundant, very small or zero adjustments, or infrequently occurring. In FIG. 1, although the third kerning pair 146 may be associated with the same glyphs as the first kerning pair 142, the third kerning pair 146 may have a horizontal adjustment value of "−27; 0," indicating that the first glyph "129" of the third kerning pair 146 is to be adjusted negative 27 PPEM in the horizontal direction. The third kerning pair 146 may also indicate a vertical position adjustment value of "1; 27," resulting in a positive 1 PPEM adjustment for the first glyph and a positive 27 PPEM adjustment for the second glyph.

The glyph positioning data 134 may include a fourth kerning pair 148 with a kerning pair identifier of "105,036." The fourth kerning pair 148 may be the last and/or final kerning pair associated with the font in the first font data 120. The first font data 120 may therefore have a total number of 105,036 pairs. The fourth kerning pair 148 may include glyphs associated with glyph identifiers "66" and "99." The fourth kerning pair 146 may indicate a vertical position adjustment value of "75; 0," resulting in a positive 75 PPEM adjustment for the first glyph.

Displaying type or text on a particular device at a specific point size yields an effective resolution measured in PPEM. PPEM values may be converted to design units via one or more mathematical equations. For example, using the font design units and device pixels per inch, a number of pixel adjustments may be calculated. Kerning adjustments may result in relatively large or relatively small positional adjustments. For example, a kerning adjustment of 20 PPEM may result in an adjustment of 20 pixels per "em," which is a unit equal to a specified point size. Accordingly, a 20 design unit adjustment for a 12 point font may be a relatively small positional adjustment, depending on a resolution. As a result, a 20 design unit adjustment may be imperceptible to a user that is consuming the content. In some instances, although a kerning adjustment may be perceptible to a user, the adjustment may not affect (e.g., improve or worsen) readability of text content. Embodiments of the disclosure therefore determine kerning pairs that may affect readability and include some or all of the determined kerning pairs in font files, so as to maintain readability while improving processing and handling of content.

To render the text content 110, the user device 100 may access the first font data 120 and the glyph positioning data 130. Before rendering or, in some instances, prior to or during pre-rendering of the text content 110, the user device 100 may analyze the first font data 120 to determine whether the number of kerning pairs in the glyph positioning data 130 may be reduced. For example, the user device 100 may execute computer-executable instructions of a kerning pair reduction module 150 that may be stored locally at the user device 100 or remotely accessed by the user device 100. In some instances, the kerning pair reduction module 150 may be stored and/or executed at a remote server, and may be executed by the remote server to analyze the first font data 120. The remote server may communicate the results of the first font data 120 analysis to the user device 100.

The kerning pair reduction module 150 may be executed to reduce a number of kerning pairs associated with the first font data 120. The kerning pair reduction module 150 may remove kerning pairs from the first font data 120 by disassociating and/or deleting one or both of the glyph identifiers from each other or from the kerning pair identifier, among other methods. Upon reducing a number of kerning pairs associated with the first font data 120, the kerning pair reduction module or the user device 100 (or a remote server in some instances) may generate a second font data 160 with the reduced number of kerning pairs.

The kerning pair reduction module 150 may reduce a number of kerning pairs of the first font data 120 by analyzing the kerning pairs of the glyph positioning data 130. For example, the kerning pair reduction module 150 may analyze the glyph positioning data 130 to determine a total number of kerning pairs. In some embodiments, the kerning pair reduction module 150 may optionally compare the total number of kerning pairs to a target number of kerning pairs in order to determine whether kerning pair reduction is needed. The target number of kerning pairs may be a desired number or number range of kerning pairs. For example, the kerning pair reduction module 150 may determine that the glyph positioning data 130 has 105,036 kerning pairs. The kerning pair reduction module 150 may compare the 105,036 to a target number of kerning pairs of 10,000 to determine that the first font data 120 and/or the glyph positioning data 130 should be processed or analyzed to reduce the total number of kerning pairs. In other embodiments, the kerning pair reduction module 150 may be executed without comparing the total number of kerning pairs to a target number of kerning pairs.

The kerning pair reduction module 150 of the user device 100 may reduce the total number of kerning pairs of the first font data 120 via one or more methods. For example, the kerning pair reduction module 150 may reduce the total number of kerning pairs by identifying and/or determining redundant kerning pairs. For example, certain fonts may be associated with kerning pairs that were automatically generated by software tools and that include multiple kerning pairs with small or zero positional adjustment values. Embodiments of the disclosure may identify and/or determine and remove the duplicate or multiple kerning pairs. Redundant kerning pairs may be identified by determining that the kerning pair is associated with the same first glyph identifier and second glyph identifier. In some instances, only the kerning pair with the greatest positional adjustment of the multiple kerning pairs may be retained, while the remaining multiple kerning pairs are removed. For example, in FIG. 1, the first kerning pair 142 and the third kerning pair 146 are both associated with the same first and second glyphs and may therefore be considered a multiple kerning pair. Since the first kerning pair 142 may have a greater positional adjustment (the −29 horizontal adjustment), the first kerning pair 142 may be retained, while the third kerning pair 146 may be removed.

In another example, the kerning pair reduction module 150 may reduce the total number of kerning pairs of the first font data 120 by identifying and/or determining whether positional adjustments associated with a particular kerning pair meet or exceed a kerning adjustment threshold value. For example, certain positional adjustments may not be noticeable to a user, and may therefore be removed. A positional adjustment threshold, which may be indicative of a minimum design unit adjustment at or below which may be deemed imperceptible to the user, may be set to remove kerning pairs that do not satisfy the positional adjustment threshold. For example, the positional adjustment threshold may be set at 30 design units. As a result, kerning pairs with one or more positional adjustments below 30 PPEM (or in some embodiments at or below 30 design units) may be removed. Alternately, or in addition, kerning pairs with one or more positional adjustments at or above 30 design units may be retained.

In another example, the kerning pair reduction module 150 may reduce the total number of kerning pairs of the first font data 120 by identifying and/or determining kerning pairs that do not meet a frequency of occurrence threshold across a corpus of literature. The frequency of occurrence threshold may be a corpus frequency of occurrence threshold that is based at least in part of a frequency that a particular pair of characters appears in a corpus of literature. For example, the frequency of occurrence for the character pair of "th" in a corpus of English literature may be relatively greater than the frequency of occurrence for the character pair of "qz" in the corpus of English literature. Frequency of occurrence may be indicated by any suitable metric, such as a numerical value or ranking, a scale, or another system. The frequency of occurrence threshold may be predetermined and may be set and/or determined based at least in part on character pairs found in particular content. For example, frequency of occurrence thresholds may be determined based at least in part on a frequency of occurrence of character pairs relative to other character pairs found in particular content (e.g., particular title, genre of content, category of content, etc.). The corpus frequency of occurrence threshold may be a minimum frequency for a pair of characters to retain a kerning pair as part of a font file.

In another example, the kerning pair reduction module 150 may reduce the total number of kerning pairs of the first font data 120 by identifying and/or determining kerning pairs that do not meet a frequency of occurrence threshold within specific content, such as within an e-book. The frequency of occurrence for specific content may be a frequency with which a certain character pair appears in content. For example, while a frequency of occurrence in a corpus of literature may be relatively low for a certain character pair, the frequency of occurrence for the same character pair in particular text may be relatively high. As a result, the kerning pair reduction module 150 may be configured to retain kerning pairs that meet or exceed the frequency of occurrence threshold for particular content. In one example, a frequency of occurrence for a particular character pair may be determined by analyzing text of the content, while in other embodiments, the frequency of occurrence may be identified from data associated with particular content.

The kerning pair reduction module 150 may perform some or all of these methods in order to reduce the total number of kerning pairs associated with the first font data 120. In some instances, such as instances in which a target number of kerning pairs is desired, the kerning pair reduction module 150 may iteratively perform one or more of these methods, in any order, and may determine whether a subsequent reduction operation is to be performed upon completion of one of the methods. For example, the kerning pair reduction module 150 may first remove redundant kerning pairs and then determine whether the target number of kerning pairs is satisfied. If not, the kerning pair reduction module 150 may proceed to perform another of the kerning pair reduction methods, and so forth, until the target number of kerning pairs is met or exceeded (e.g., there are less kerning pairs remaining than the target number).

In the example of FIG. 1, the kerning pair reduction module 150 may generate second font data 160. The second font data 160 may include glyph positioning data 170 that includes kerning pairs 180 that remain after the kerning pair reduction module 150 processes the first font data 120. For example, a first kerning pair 182 may be removed and/or deleted from the glyph positioning data 170 because the horizontal adjustment of −27 PPEM associated with the first kerning pair 182 may not meet a minimum adjustment threshold of 30 design units. The threshold may be an absolute value of the positional adjustment value. The first kerning pair 182 may be deleted or removed by disassociating one or both of the glyph identifiers from each other or from the kerning pair identifier. In the example of FIG. 1, the second glyph identifier of the first kerning pair 182 may be deleted from the first kerning pair 182 in the glyph positioning data 170, thereby removing the first kerning pair 182 from the second font data 160. A second kerning pair 184 of the glyph positioning data 170 may be retained because the second kerning pair 184 includes a horizontal adjustment of 55 PPEM, which may be greater than a positional adjustment threshold (such as 30 design units). A third kerning pair 186 may be the 86,786$^{th}$ kerning pair that was associated with the first font data 120, but may be deleted from the glyph positioning data 170 and/or the second font data 160. For example, the third kerning pair 186 may be deleted and/or removed from the glyph positioning data 170 because the third kerning pair 186 is redundant in view of the first kerning pair 182. The first kerning pair 182 and the third kerning pair 186 both are associated with the same first glyph identifier and the same second glyph identifier, and thus one or both may be deleted. In some instances, the redundant kerning pair with the greater positional adjustment may be retained while the other redundant kerning pair may be removed. In the example of FIG. 1, however, neither of the first kerning pair 182 nor the third kerning pair 186 may be retained (both may be removed) because neither is associated with a positional adjustment that meets the positional adjustment threshold of 30 PPEM. A fourth kerning pair 188 may be the last kerning pair of the second font data 160 and may be the 9,568$^{th}$ kerning pair. Accordingly, the kerning pair reduction module 150 may reduce the number of kerning pairs from 105,036 in the first font data 120 to 9,568 kerning pairs in the second font data 160. The user device 100 may generate the second font data 160 and/or a font file including the second font data 160 for use in rendering the text content 110.

A rendering engine 190 of the user device 100 may render the text content 110 using the second font data 160. Because the second font data 160 may be smaller in size and may include a reduced number of kerning pairs, the rendering engine 190 may be able to render the text content 110 relatively faster than if the rendering engine 190 rendered the text content 110 using the first font data 120.

The user device 100 may pre-render the text content 110 by identifying a first glyph to be rendered. The first glyph may be "W" of the kerning pair 184 of the text content 110. The user device 100 may pre-render the first glyph "W" based at least in part on the second font data 160. For example, the user device 100 may determine an outline of the glyph based at least in part on the second font data 180. During pre-rendering, the first glyph "W" may be hidden or otherwise invisible to the user. The text content 110 may not be rendered and/or presented until the entire text content 110 is ready for rendering. The user device 100 may identify a second glyph of "e" of the kerning pair 184 that is to be rendered. The user device 100 may pre-render the second glyph "e" based at least in part on the second font data 160.

The user device 100 may determine that the first glyph and the second glyph are rendered adjacent to each other. In some embodiments, the first glyph and the second glyph may be determined to be a pair of glyphs due to the adjacent positioning. The user device 100 may determine, based at least in part on the second font data 160, whether the first glyph and/or the second glyph are to be rendered with any non-default positioning. For example, the user device 100 may search some or all of the second font data 160 to determine whether there are any positional adjustments for either or both the first glyph or the second glyph. In another example, the user device 100 may compare a first glyph identifier associated with the first glyph and a second glyph identifier associated with the second glyph with the glyph positioning data 170 to determine whether the glyph positioning data 170 includes the pair of glyphs. The user device 100 may continue to render the text content 110.

Example embodiments of the disclosure provide a number of technical features or technical effects. For example, in accordance with example embodiments of the disclosure, font files may be generated with a reduced amount of kerning pairs, which may be relatively smaller in size and may result in faster download speeds, faster accessing of content, and faster rendering of text content using the font file. Kerning pairs associated with fonts may be reduced by embodiments of the disclosure by removing kerning pairs that do not meet a frequency of occurrence threshold for a corpus of literature and/or for a particular text content, that do not meet a threshold positional adjustment amount and may therefore be imperceptible to a user, and/or that are redundant. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
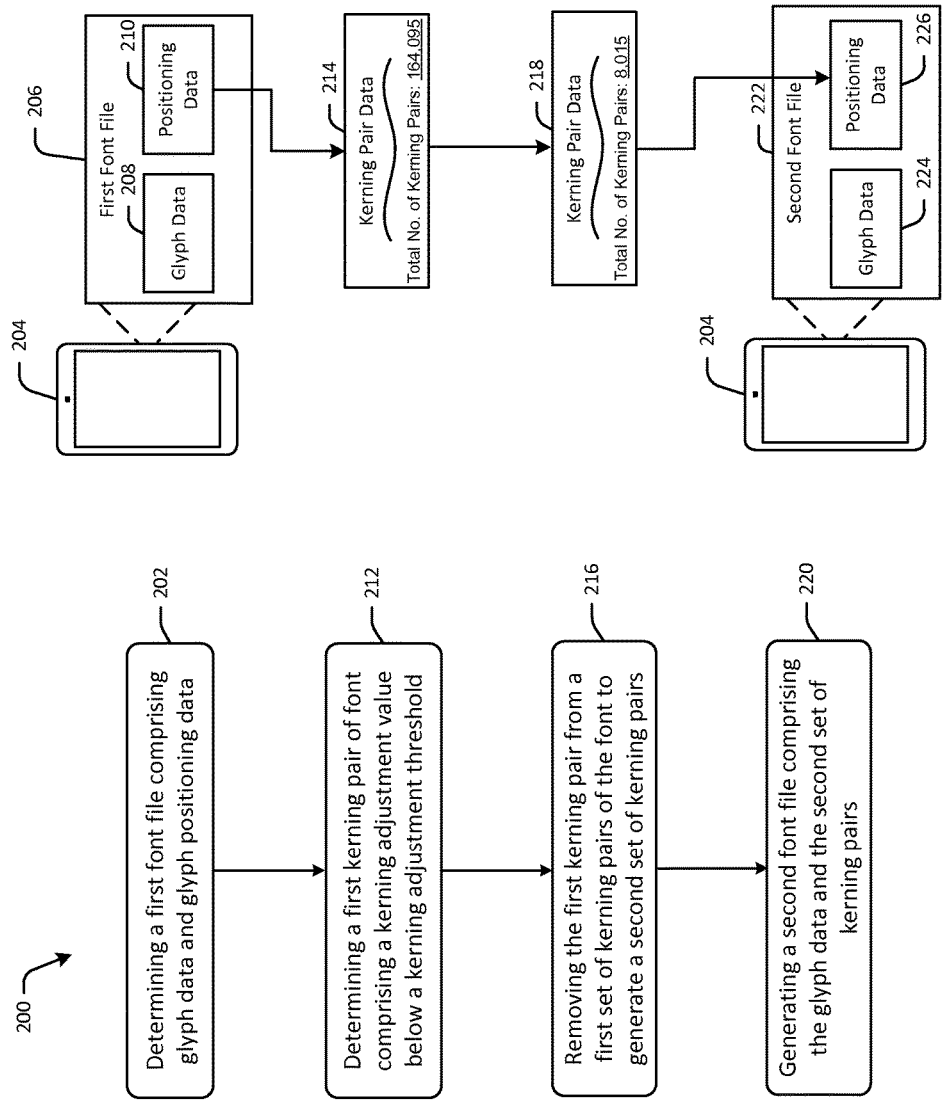
FIG. 2 is a schematic hybrid process and data flow diagram illustrating dynamic kerning pair reduction for digital font rendering in accordance with one or more example embodiments of the disclosure.

FIG. 2 depicts an example process flow 200 and example data flow for dynamic kerning pair reduction for digital font rendering in accordance with one or more embodiments of the disclosure. Specifically, FIG. 2 depicts the process flow 200 and a user device 204. The user device 204 may be the same as, or different than, the user device 100 of FIG. 1. While example embodiments of the disclosure may be described in the context of user devices, it should be appreciated that the disclosure is more broadly applicable to any electronic device configured to execute some or all of the operations described herein.

At block 202 of the process flow 200 in FIG. 2, the user device 204 may determine a first font file. The first font fie may include glyph data and glyph positioning data. For example, the user device 204 may determine a first font file 206 with glyph data 208 and positioning data 210. The glyph data 206 may include information used to render one or more glyphs by the user device 204, and the positioning data 210 may include positioning information for one or more glyphs (e.g., default positioning, kerning adjustments, etc.).

At block 212 of the process flow 200, the user device 204 may determine a first kerning pair of the font that comprises a kerning adjustment value below a kerning adjustment threshold. For example, the user device 204 may determine, based at least in part on the positioning data 210, kerning pair data 214. The kerning pair data 214 may include information related to a total number of kerning pairs associated with the font file. The user device 204 may analyze the kerning pair data 214 to remove one or more kerning pairs that include kerning adjustments that are below a kerning adjustment threshold, which may be represented as a numerical value and/or a certain design unit, such as 30 PPEM or 50 PPEM, etc.

At block 216 of the process flow 200, the user device 204 may remove the first kerning pair from a first set of kerning pairs associated with the font to generate a second set of kerning pairs. For example, the user device 204 may remove one or more kerning pairs from the first set of kerning pairs associated with the kerning pair data 214 to generate a second set of kerning pairs associated with second kerning pair data 218. In the example of FIG. 2, the user device 204 may reduce the number of kerning pairs from 164,095 in the first font file to 8,015 in the second set of kerning pairs 218.

At block 220 of the process flow 200, the user device 204 may generate a second font file comprising the glyph data and the second set of kerning pairs. For example, the user device 204 may generate a second font file 222 with glyph data 224, which may the same glyph data as the glyph data 208, and positioning data 226 which may include the reduced set of kerning pairs in the kerning pair data 218 rather than the kerning pair data 214 that was associated with the first font file 206.

Figure 3:
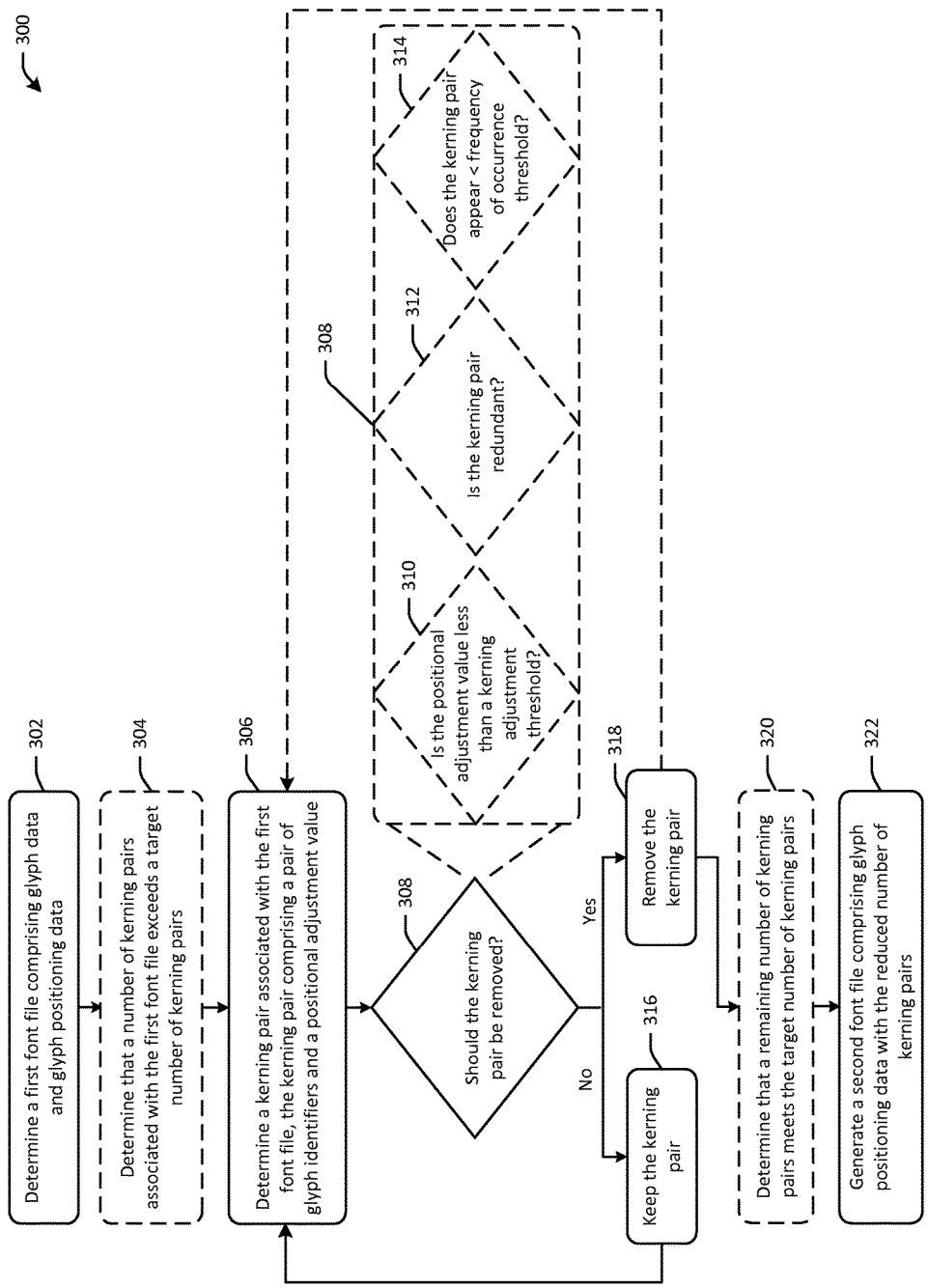
FIG. 3 is a schematic illustration of an example process flow for dynamic kerning pair reduction for digital font rendering in accordance with one or more example embodiments of the disclosure.
Figure 4:
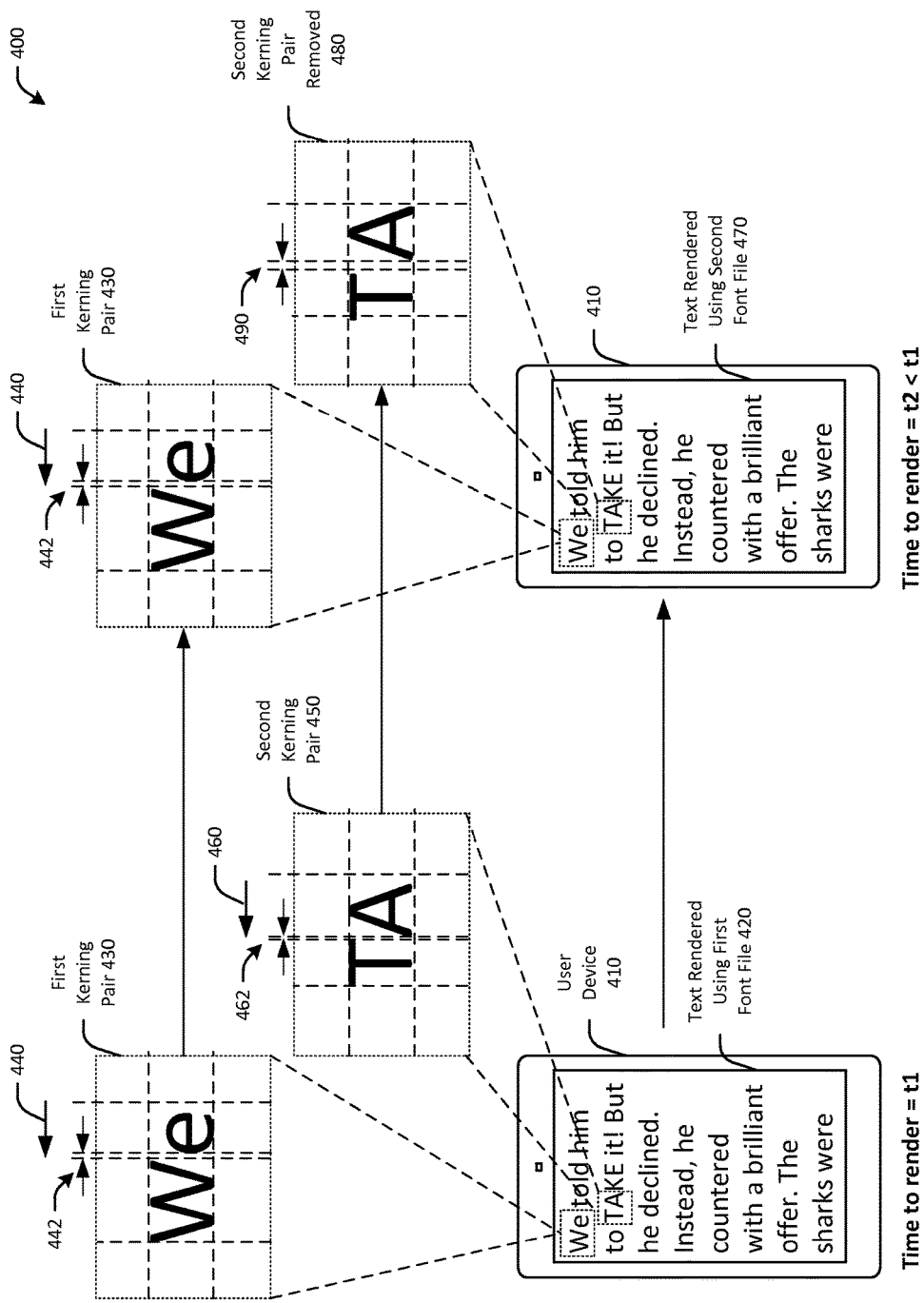
FIG. 4 is a schematic illustration of an example use case for dynamic kerning pair reduction for digital font rendering in accordance with one or more example embodiments of the disclosure.

FIG. 3 depicts an example process flow 300 for dynamic kerning pair reduction for digital font rendering in accordance with one or more embodiments of the disclosure and will be discussed in conjunction with an example use case 400 depicted in FIG. 4 in accordance with one or more embodiments of the disclosure. At block 302 of FIG. 3, the process flow 300 may include determining a first font file comprising glyph data and glyph positioning data. For example, a user device 410 of FIG. 4 may receive an indication to render a source text. The user device 410 may be the same or different that the user devices 100, 204 of FIGS. 1-2. The user device 400 may determine a first font file to render text, where the first font file includes glyph data and glyph positioning data. The glyph data may include a set of glyphs representing English, French, German, Spanish, Portuguese, Italian, or other Latin language characters, and the glyph positioning data may include a set of kerning pairs, which may be associated with a glyph positioning table in some embodiments.

At block 304 of FIG. 3, the process flow 300 may include an optionally determining that a number of kerning pairs associated with the first font file exceeds a target number of kerning pairs. For example, the user device 410 may determine that the first font file is associated with 50,000 kerning pairs, which may exceed a target number of 10,000 kerning pairs.

At block 306 of FIG. 3, the process flow 300 may include determining a kerning pair associated with the first font file that includes a pair of glyph identifiers and a positional adjustment value. For example, the user device 410 may determine a glyph positioning table associated with the first font file for use in rendering the text of FIG. 4. In some embodiments, the user device 410 may parse the first font file to determine the glyph positioning table and/or the set of kerning pairs associated with the font. To determine one or more kerning pairs associated with a font, the user device 410 may parse the determined or identified glyph positioning table, a pair positioning table, or other positioning data to determine kerning pairs associated with the font. In one example, the glyph positioning table may provide precise control over glyph placement for text layout and rendering in the scripts and language systems that a font supports. During text processing, the user device 410 may apply a lookup to each glyph in a string before moving to the next lookup. A lookup may be finished for a glyph after the user device 410 locates the target glyph or glyph context and performs a positioning, if specified. The glyph positioning data may define attachment points to combine glyphs and position them with respect to one another. A glyph may have multiple attachment points. The point used will depend on the glyph to be attached. For instance, a base glyph could have attachment points for different diacritical marks. The glyph positioning data may supports one or more, such as eight, types of actions for positioning and attaching glyphs, including a single adjustment position one glyph, such as a superscript or subscript.

The user device 410 may parse the glyph positioning data, or in some instances, a glyph positioning table, to determine a first number of kerning pairs in the set of kerning pairs for the font file. The glyph positioning data may include a first glyph identifier associated with the first kerning pair, a second glyph identifier associated with the first kerning pair, and/or a kerning adjustment value associated with the first kerning pair. The kerning adjustment value may include a horizontal adjustment, a vertical adjustment, and/or a diagonal adjustment.

At determination block 308 of FIG. 3, the process flow 300 may include a determination as to whether the determined kerning pair should be removed. For example, one or more modules of the user device 410 may be executed to determine the kerning pair and/or to determine whether the kerning pair should be removed. The determination as to whether a kerning pair should be removed may be performed via one or more of a number of methods. For example, in FIG. 3, the process flow 300 includes optional processes that may be performed to determine whether a kerning pair should be removed.

At a first example determination 310 of the determination block 308, the process flow 300 may include determining whether the positional adjustment value for the determined kerning pair is less than a kerning adjustment threshold. For example, the kerning adjustment threshold may be 50 PPEM, and if the kerning adjustment for the determined kerning pair is less than 50 PPEM, the kerning pair may not meet the kerning adjustment threshold.

If it is determined at determination block 310 that the kerning pair does not have a positional adjustment value less than the kerning adjustment threshold, or that the kerning pair meets or exceeds the kerning pair adjustment threshold, the process flow 300 may continue to block 316, at which the kerning pair is kept or returned. The process flow 300 may then return to block 306 in an iterative process to determine whether another kerning pair should be removed. The process flow 300 may continue until some or all of the kerning pairs have been processed, or until a target number of kerning pairs has been reached in some embodiments.

At a second example determination block 312, the process flow 300 may include determining whether the kerning pair is redundant. For example, the user device 410 of FIG. 4 may determine whether a kerning pair is associated with the same first and second glyph identifiers as a second kerning pair. If it is determined at determination block 312 that the kerning pair is not redundant, the process flow 300 may continue to block 316, at which the kerning pair is kept or retained. The process flow 300 may then return to block 306 in an iterative process to determine whether another kerning pair should be removed. The process flow 300 may continue until some or all of the kerning pairs have been processed, or until a target number of kerning pairs has been reached in some embodiments.

At a third example determination block 314, the process flow 300 may include determining whether the kerning pair appears less than a frequency of occurrence threshold. For example, the frequency of occurrence threshold may be for a corpus of literature, for particular content, or a combination thereof. For example, if the frequency of occurrence for characters associated with a kerning pair occur once in the text, and the threshold is 15 times, or 1%, or the like, the kerning pair may not meet or may be less than the frequency of occurrence threshold. On the other hand, if the frequency of occurrence of the character pair is 3% across a corpus of literature, and the threshold is 1%, the kerning pair may be determined to meet or exceed the frequency of occurrence threshold. If it is determined at determination block 314 that the character pairs associated with the kerning pair appear less than a frequency of occurrence threshold, the process flow 300 may the process flow 300 may continue to block 316, at which the kerning pair is kept or retained. The process flow 300 may then return to block 306 in an iterative process to determine whether another kerning pair should be removed. The process flow 300 may continue until some or all of the kerning pairs have been processed, or until a target number of kerning pairs has been reached in some embodiments. In one example embodiment, the user device 410 may determine a frequency of occurrence of a character pair comprising a first character and a second character in a corpus of literature. The user device 410 may determine that the frequency of occurrence is below a frequency of occurrence threshold, and may remove the kerning pair. In another example embodiment, the user device 410 may determine a frequency of occurrence of a character pair in a source text, and may determine that the frequency of occurrence of the character pair is below a frequency of occurrence threshold. The user device 140 may remove the kerning pair. In another example, the user device 410 may determine that a character does not appear at all in particular text (e.g., has a frequency of occurrence of 0 in the text), and as a result, may remove the kerning pair.

In another example determination, the process flow 300 may include optionally comparing the determined kerning pair to a set of one or more preapproved kerning pairs. If it is determined that the kerning pair is not preapproved, the kerning pair may be removed.

If it is determined at determination block 308, or at any one or more of optional determination blocks 310, 312, or 314, that the kerning pair should be removed, the process flow 300 may proceed to block 318. For example, if it is determined that the positional adjustment value is less than a kerning adjustment threshold, or that the kerning pair is redundant, or that the characters associated with the kerning pair do not have a frequency of occurrence (in either a corpus of literature or within specific content) that satisfies a frequency of occurrence threshold, the kerning pair may be removed. A corpus of literature may include between about 50,000 to about several million books per language, in one example.

At block 318, the kerning pair may be removed from the first font file. For example, the user device 410 may remove the kerning pair be disassociating the second glyph identifier with the first glyph identifier and/or the kerning pair identifier, or vice versa. The process flow 300 may optionally return to block 306 in an iterative process to determine whether another kerning pair should be removed. The iterative process may continue, for example, until a certain number or all of the kerning pairs are evaluated, or until the target number of kerning pairs has been satisfied in some embodiments.

After removing the kerning pair, the process flow 300 may proceed to optional block 320, which includes determining that a remaining number of kerning pairs meets the target number of kerning pairs.

Block 322 of the process flow 300 may include generating a second font file with glyph positioning data with the reduced number of kerning pairs. For example, the user device 410 may generate a second glyph positioning table or second glyph positioning data with the second number of kerning pairs remaining in the set of kerning pairs. The user device 410 may serialize the second glyph positioning table and may generate a second font file that may include the glyph data and the second glyph positioning table.

The user device 410 may render the text content using the second font file. For example, in FIG. 4, the user device 410 may render the depicted text content using the second font file generated by the process flow 300 of FIG. 3. At a first instance 420, the user device 410 may have rendered text using the first font file. The time to render may have been t1. The rendered text may have included a first kerning pair 430 that may have included a positional adjustment of a second glyph in a horizontal direction 440, such that a distance between a first glyph "W" and the second glyph "e" was a gap 442. The gap 442 may be less than a gap without the kerning pair. The horizontal kerning adjustment may be 60 PPEM and may result in a relatively more readable "We" in FIG. 4. The text rendered using the first font file 420 may include a second kerning pair 450 with a second glyph kerning adjustment in a horizontal direction 460 to reduce a gap between the first glyph "T" and the second glyph "A" to a gap 462. The kerning adjustment may have a value of 25 PPEM and may be marginally noticeable or imperceptible by a user upon rendering.

At a second instance 470, the user device 410 may render the same text using the second font file 470. The time to render the text using the second font file 470, compared to rendering the text using the first font file 420, may be t2, which may be less than t1, resulting in a relatively quicker rendering of the text. Further, because the second font file includes less kerning pairs than the first font file, the second font file may be rendered with a reduced amount of computing power relative to computing power needed to render the text using the first font file.

The text rendered using the second font file 470 may retain the first kerning pair 430, and may maintain the horizontal kerning adjustment 440 and gap 442 to maintain readability and/or user experience attributes. However, the second font file may not include the second kerning pair 450. As a result, the second kerning pair 450 may be removed, and the first and second glyphs of the second kerning pair 450 may be rendered without the second kerning pair as unkerned second pair 480. The unkerned second pair 480 may have a gap 490 greater than the gap 462 of the rendering with the second kerning pair 450; however, the characters of the second kerning pair may still be as readable as with the kerning adjustment. The kerning adjustment may not have been noticeable by a user, or may have had an insufficient impact on the rendering of the text, and may therefore have been removed. As a result, the rendered text may retain readability and consumer or user experience while processing and rendering the text relatively quickly. While the gap 490 may be bigger than the kerned gap 462, the difference between gap 490 and gap 462 may be below the kerning adjustment threshold and the second kerning pair may be removed.

Referring to FIG. 5, a schematic illustration of an example user device 500 and example glyph positioning data 510 in accordance with one or more example embodiments of the disclosure is depicted. The glyph positioning data 510 may be generated by the user device 500 or a remote server using one or more of the methods described herein. The glyph positioning data 510 may be a glyph positioning table in some embodiments. The glyph positioning data 510 may include a number of kerning pairs that may be associated with kerning pair identifiers 520. The kerning pairs may be associated with first and second glyph identifiers, positional adjustments, language frequency of occurrence scores or indicators (based at least in part on frequency of occurrence across a corpus of language-specific literature), and/or content frequency of occurrence for particular content. The positional adjustments may include horizontal adjustments, vertical adjustments, and/or diagonal adjustments, and may be represented, in some embodiments, as positive or negative numerical values. The language frequency and/or content frequency may be represented as numerical scores or rankings in some embodiments. Other embodiments of glyph positioning data may include additional or fewer information and may not be in table form as illustrated in the example of FIG. 5. The glyph positioning data 510 may have been generated with a positional adjustment threshold or kerning adjustment threshold of 40 design units, a language frequency of occurrence threshold of 60, and a content frequency of occurrence threshold of 50.

The glyph positioning data 510 may include a first kerning pair 530 with a horizontal adjustment of −27. The kerning adjustment threshold may be 40 design units, or 40 PPEM. However, the first kerning pair 530 may be retained, although the kerning adjustment is below the kerning adjustment threshold, because the frequency of occurrence of the first kerning pair 530 in the language is 70, which may be a 70/100 or any other suitable metric and may meet or exceed a corpus frequency of occurrence threshold (e.g., threshold of 60, etc.). In another example, the first kerning pair 530 may be retained because the first kerning pair 530 has a content frequency of 59, which may be a score, and may be 59/100 or any other suitable metric and may meet or exceed a corpus frequency of occurrence threshold (e.g., threshold of 50, etc.). In some embodiments, the first kerning pair 530 may be retained because of the language frequency and the content frequency, while in other embodiments, the first kerning pair 530 may be retained upon meeting at least one of the frequency of occurrence thresholds.

The glyph positioning data 510 may include a second kerning pair 540 that may have relatively low language and/or content frequencies. For example, the language frequency may be a score of 19 and the content frequency may be a score of 44. Although the language frequency and the content frequency are below the respective thresholds, the second kerning pair 540 may be retained because the second kerning pair 540 satisfies the kerning adjustment threshold.

The glyph positioning data 510 may include a third kerning pair 550 with a kerning pair identifier of 43,699. The third kerning pair 550 may indicate a diagonal adjustment of 45 design units, and may therefore satisfy the kerning adjustment threshold. However, because the third kerning pair 550 does not satisfy either of the language or content frequency thresholds, the third kerning pair 550 may be removed by deleting or disassociating the second glyph identifier from the first glyph identifier. While the third kerning pair 550 is shown in the glyph positioning data 510 of FIG. 5, it is understood that the glyph positioning data 510 may not include kerning data for removed kerning pairs; the deleted kerning pairs are illustrated only for explanation purposes. Further, the priority of whether a kerning pair satisfies any one criteria may be predetermined in that if a kerning pair satisfies a particular criteria, the kerning pair is retained, regardless of whether the kerning pair satisfies other criteria. In other embodiments, a kerning pair may be retained as long as one criteria is satisfied, even if other criteria are not satisfied. For example, the third kerning pair 550 may be retained due to a positional adjustment of 45 that meets or exceeds the positional adjustment threshold.

The glyph positioning data 510 may include a fourth kerning pair 560 associated with a kerning pair identifier of 78,063. The fourth kerning pair 560 may optionally be deleted, depending on the criteria by which the user device 500 or remote server evaluates individual kerning pairs. For example, the fourth kerning pair 560 may be automatically deleted because the language frequency of 1 falls below a minimum language frequency threshold of 5. In other embodiments, the fourth kerning pair 560 may be retained due to a positional adjustment of 44 that meets or exceeds the positional adjustment threshold.

The glyph positioning data 510 may include a fifth kerning pair 570 associated with a kerning pair identifier of 86,786. The fifth kerning pair 570 may be deleted in some embodiments because the fifth kerning pair 570 is associated with a maximum positional adjustment of 20 design units, although the fifth kerning pair 570 may satisfy both the language frequency threshold and the content frequency threshold. In other embodiments, the fifth kerning pair 570 may be retained due to satisfying one or both of the frequency thresholds.

The glyph positioning data 510 may include a sixth kerning pair 580 that may be retained due to a positional adjustment of 75, or may be deleted as shown in FIG. 5 for having a content frequency of below a minimum frequency. Although the sixth kerning pair 580 may satisfy the positional adjustment threshold and the language frequency threshold, the sixth kerning pair 580 may still be deleted because of its infrequent appearance in the text itself.

One or more operations of the method, process flows, or use cases of FIGS. 1-5 may have been described above as being performed by a user device, or more specifically, by one or more program modules, applications, or the like executing on a device. It should be appreciated, however, that any of the operations of methods, process flows, or use cases of FIGS. 1-5 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
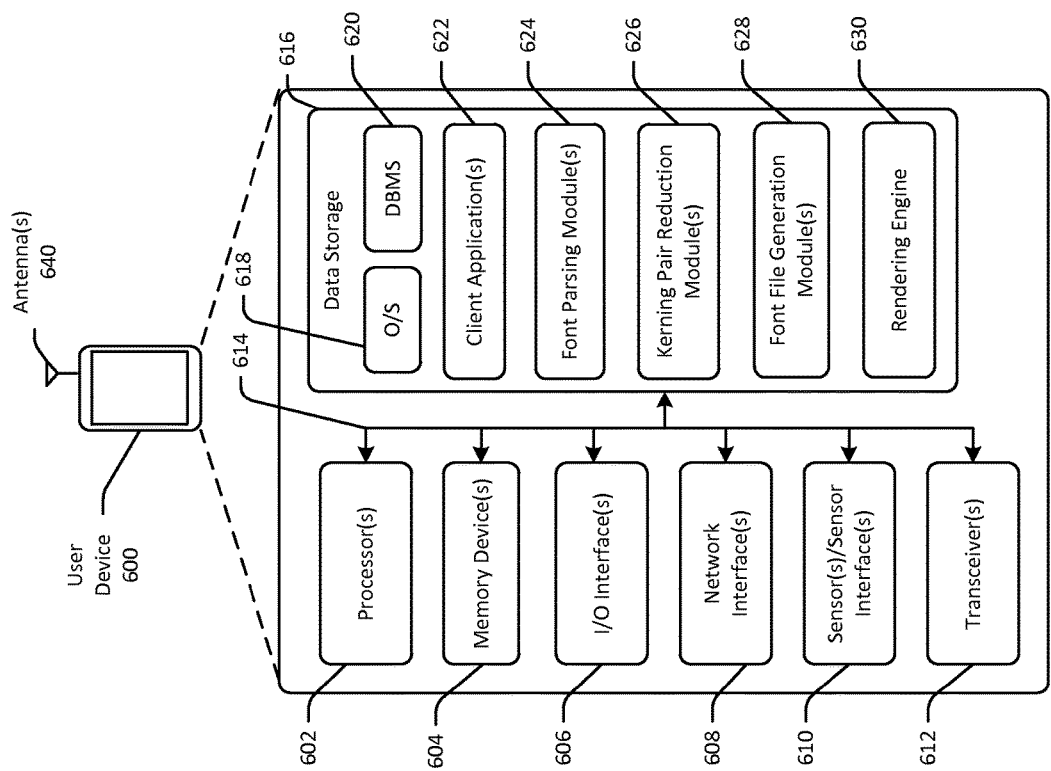
FIG. 6 is a schematic diagram of an illustrative device architecture in accordance with one or more example embodiments of the disclosure.

FIG. 6 is a schematic diagram of an illustrative device architecture in accordance with one or more example embodiments of the disclosure. The user device 600 may include any suitable computing device including, but not limited to, a mobile device such as a smartphone, tablet, e-reader, wearable device, or the like; a desktop computing device; a laptop computing device; and so forth. The user device 600 may correspond to an illustrative device configuration for the user device of FIGS. 1-5.

In an illustrative configuration, the device 600 may include one or more processors (processor(s)) 602, one or more memory devices 604 (generically referred to herein as memory 604), one or more input/output ("I/O") interface(s) 606, one or more network interface(s) 608, one or more sensors or sensor interface(s) 610, one or more transceiver(s) 612, and data storage 616. The device 600 may further include one or more buses 614 that functionally couple various components of the device 600. The device 600 may further include one or more antennas 640 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 614 may include at least one of a system bus, a memory bus, an address bus, or a message bus, and may permit exchange of information (e.g., data (including computer-executable code), signaling, etc.) between various components of the device 600. The bus(es) 614 may include, without limitation, a memory bus or a memory controller, a peripheral bus, an accelerated graphics port, and so forth. The bus(es) 614 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 616 may include removable storage and/or non-removable storage including, but not limited to, magnetic storage, optical disk storage, and/or tape storage. Persistent data storage, as that term is used herein, may include any of the types of data storage 616 mentioned above. The data storage 616 may provide non-volatile storage of computer-executable instructions and other data. The memory 604 and the data storage 616, removable and/or non-removable, are examples of computer-readable storage media (CRSM) as that term is used herein.

The data storage 616 may store computer-executable code, instructions, or the like that may be loadable into the memory 604 and executable by the processor(s) 602 to cause the processor(s) 602 to perform or initiate various operations. The data storage 616 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 616 for non-volatile storage.

More specifically, the data storage 616 may store one or more operating systems (O/S) 618; one or more database management systems (DBMS) 620; and one or more program modules, applications, engines, or the like such as, for example, one or more client application(s) 622, one or more font parsing module(s) 624, one or more kerning pair reduction module(s) 626, one or more font file generation module(s) 628, a rendering engine 630, and so forth. These program modules, applications, engines, or the like may be configured to perform operations described earlier in this application in connection with corresponding components. Any of the program modules, applications, engines, or the like depicted in FIG. 6 may include any combination of software, firmware, and/or hardware. The software and/or firmware may include computer-executable code, instructions, or the like that may be loaded into the memory 604 for execution by one or more of the processor(s) 602. The data storage 616 may further store various types of data. Any data stored in the data storage 616 may be loaded into the memory 604 for use by the processor(s) 602 in executing computer-executable code. In addition, any data depicted as being stored in the data storage 616 may potentially be stored in one or more datastore(s) (not shown in FIG. 6) and may be accessed via the DBMS 620 and loaded in the memory 604 for use by the processor(s) 602 in executing computer-executable code. Such datastore(s) may include, but are not limited to, databases (e.g., relational, object-oriented, etc.), file systems, flat files, distributed datastore(s) in which data is stored on more than one node of a computer network, peer-to-peer network datastore(s), or the like.

The processor(s) 602 may be configured to access the memory 604 and execute computer-executable instructions loaded therein. For example, the processor(s) 602 may be configured to execute computer-executable instructions of the various program modules, applications, engines, or the like of the user device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program modules depicted in FIG. 6, the font parsing module(s) 624 may include computer-executable instructions, code, or the like that responsive to execution by one or more of the processor(s) 602 may perform functions including, but not limited to, identifying or determining a font file that may be used in rendering content, such as text content, parsing a font file and/or determining information associated with a font file, parsing tables and/or other information associated with a font file, and the like.

The kerning pair reduction module(s) 626 may include computer-executable instructions, code, or the like that responsive to execution by one or more of the processor(s) 602 may perform functions including, but not limited to, identifying kerning pairs associated with a font file, determining kerning pairs to remove and/or retain for specific fonts, associating and/or disassociating glyph identifiers with each other and/or with kerning pairs, analyzing glyph positioning data, and the like.

The font file generation module(s) 628 may include computer-executable instructions, code, or the like that responsive to execution by one or more of the processor(s) 602 may perform functions including, but not limited to, generating font files with reduced kerning pairs for use in rendering content.

The rendering engine 630 may include computer-executable instructions, code, or the like that responsive to execution by one or more of the processor(s) 602 may perform functions including, but not limited to, rendering content at the user device 600 and/or at other displays.

Referring now to other illustrative components depicted as being stored in the data storage 616, the O/S 618 may be loaded from the data storage 616 into the memory 604 and may provide an interface between other application software executing on the device 600 and hardware resources of the device 600. More specifically, the O/S 618 may include a set of computer-executable instructions for managing hardware resources of the device 600 and for providing common services to other application programs (e.g., managing memory allocation among various application programs). In certain example embodiments, the O/S 618 may control execution of one or more of the program modules depicted as being stored in the data storage 616. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 616. The DBMS 620 may use any of a variety of database models (e.g., relational model, object model, etc.) and may support any of a variety of query languages. The DBMS 620 may access data represented in one or more data schemas and stored in any suitable data repository. In those example embodiments in which the device 600 is a mobile device, the DBMS 620 may be any suitable light-weight DBMS optimized for performance on a mobile device.

Referring now to other illustrative components of the device 600, the input/output (I/O) interface(s) 606 may facilitate the receipt of input information by the device 600 from one or more I/O devices as well as the output of information from the device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 640 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 600 may further include one or more network interface(s) 608 via which the device 600 may communicate with any of a variety of other systems, platforms, networks, devices, and so forth. The network interface(s) 608 may enable communication, for example, with the back-end server(s) 202 via the network(s) 206.

The antenna(s) 640 may include any suitable type of antenna depending, for example, on the communications protocols used to transmit or receive signals via the antenna(s) 640. Non-limiting examples of suitable antennas may include directional antennas, non-directional antennas, dipole antennas, folded dipole antennas, patch antennas, multiple-input multiple-output (MIMO) antennas, or the like. The antenna(s) 640 may be communicatively coupled to one or more transceiver(s) 612 or radio components to which or from which signals may be transmitted or received.

As previously described, the antenna(s) 640 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 640 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 640 may be configured to transmit or receive radio frequency signals within any suitable frequency range forming part of the unlicensed portion of the radio spectrum.

The antenna(s) 640 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 640—transmitting or receiving radio frequency (RF) signals in the bandwidth and/or channels corresponding to the communications protocols utilized by the device 600 to communicate with other devices. The transceiver(s) 612 may include hardware, software, and/or firmware for modulating, transmitting, or receiving—potentially in cooperation with any of antenna(s) 640—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 6 as being stored in the data storage 616 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 600, and/or hosted on other computing device(s) accessible via one or more networks, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that the device 600 may include alternate and/or additional hardware, software, or firmware components beyond those described or depicted without departing from the scope of the disclosure. More particularly, it should be appreciated that software, firmware, or hardware components depicted as forming part of the device 600 are merely illustrative and that some components may not be present or additional components may be provided in various embodiments. While various illustrative program modules have been depicted and described as software modules stored in data storage 616, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods described herein may be performed by a device having the illustrative configuration depicted in FIG. 6, or more specifically, by one or more engines, program modules, applications, or the like executable on such a device. It should be appreciated, however, that such operations may be implemented in connection with numerous other device configurations.

The operations described and depicted in the illustrative methods described herein may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

determining, by a device comprising at least one processor and a display, a first font file for rendering text on the display, the first font file comprising glyph data and a first glyph positioning table, wherein the glyph data comprises a set of glyphs representing English characters, and the first glyph positioning table comprises a set of kerning pairs for the font file, wherein a first kerning pair of the set of kerning pairs comprises a first glyph identifier, a second glyph identifier, a horizontal kerning adjustment value, and a frequency of occurrence for the first kerning pair;

parsing the font file to determine the first glyph positioning table;

parsing the first glyph positioning table to determine a first number of kerning pairs in the set of kerning pairs for the font file;

determining that the first number of kerning pairs exceeds a target number of kerning pairs;

determining whether the horizontal kerning adjustment value is less than a kerning pair adjustment threshold;

determining whether the frequency of occurrence is less than a frequency of occurrence threshold;

in response to determining that the kerning adjustment value is greater than or equal to the kerning pair adjustment threshold, or that the frequency of occurrence is greater than or equal to the frequency of occurrence threshold, keeping the first kerning pair in the set of kerning pairs;

in response to determining that the horizontal kerning adjustment value is less than the kerning pair adjustment threshold, and that the frequency of occurrence is less than the frequency of occurrence threshold, deleting the second glyph identifier from the first kerning pair in the first glyph positioning table to remove the first kerning pair from the set of kerning pairs;

determining that a second number of kerning pairs remaining in the set of kerning pairs of the first glyph positioning table meets the target number of kerning pairs;

generating a second glyph positioning table with the second number of kerning pairs remaining in the set of kerning pairs;

serializing the second glyph positioning table such that the second glyph table comprises kerning pair information in sequential order;

generating a second font file for rendering text on the display, the second font file comprising the glyph data and the second glyph positioning table; and rendering text on the display of the electronic reader device using the second font file.

2. The method of claim 1, further comprising:

determining a frequency of occurrence of a character pair comprising a first character and a second character in a corpus of English literature;

determining that the frequency of occurrence is below a frequency of occurrence threshold;

determining a third glyph identifier associated with the first character and a fourth glyph identifier associated with the second character;

determining a second kerning pair in the first glyph positioning table comprising the third glyph identifier and the fourth glyph identifier; and deleting the fourth glyph identifier from the second kerning pair to remove the second kerning pair from the set of kerning pairs in the first glyph positioning table.

3. The method of claim 1, further comprising:

determining a content frequency of occurrence of a character pair comprising a first character and a second character in an electronic book;

determining that the content frequency of occurrence is below a content frequency of occurrence threshold;

determining a third glyph identifier associated with the first character and a fourth glyph identifier associated with the second character;

determining a second kerning pair in the first glyph positioning table comprising the third glyph identifier and the fourth glyph identifier; and deleting the fourth glyph identifier from the second kerning pair to remove the second kerning pair from the set of kerning pairs in the first glyph positioning table.

4. The method of claim 1, further comprising:

determining a set of desired kerning pairs;

determining a second kerning pair in the first glyph positioning table comprising a third glyph identifier and a fourth glyph identifier;

comparing the second kerning pair to the set of desired kerning pairs;

determining that the set of desired kerning pairs does not include a desired kerning pair with the third glyph identifier and the fourth glyph identifier; and deleting the fourth glyph identifier from the second kerning pair to remove the second kerning pair from the set of kerning pairs in the first glyph positioning table.

5. A method comprising:

receiving, by a device comprising at least one processor and a display, a first font file for rendering text on the display, the first font file comprising glyph data and a first set of kerning pairs, wherein a first kerning pair of the first set of kerning pairs comprises a kerning adjustment value and a frequency of occurrence for the first kerning pair;

determining whether the kerning adjustment value is below a kerning adjustment threshold;

determining whether the frequency of occurrence is below a frequency of occurrence threshold;

in response to determining that the kerning adjustment value is greater than or equal to the kerning adjustment threshold, or that the frequency of occurrence is greater than or equal to the frequency of occurrence threshold, keeping the first kerning pair in the first set of kerning pairs;

in response to determining that the kerning adjustment value is less than the kerning adjustment threshold, and that the frequency of occurrence is less than the frequency of occurrence threshold, removing the first kerning pair from the first set of kerning pairs to generate a second set of kerning pairs; and generating a second font file for rendering text on the display, the second font file comprising the glyph data and the second set of kerning pairs.

6. The method of claim 5, further comprising:

determining that a first number of kerning pairs in the first set of kerning pairs exceeds a threshold number of kerning pairs; and determining that a second number of kerning pairs in the second set of kerning pairs satisfies the threshold number of kerning pairs.

7. The method of claim 5, further comprising:

parsing the first font file; and determining a table of the first font file that comprises the first set of kerning pairs;

wherein determining the table comprises determining a first glyph identifier associated with the first kerning pair, determining a second glyph identifier associated with the first kerning pair, and associating the kerning adjustment value with the first kerning pair; and the kerning adjustment value comprises a horizontal adjustment, a vertical adjustment, or a diagonal adjustment.

8. The method of claim 7, wherein removing the first kerning pair comprises disassociating the first glyph identifier or the second glyph identifier with the first kerning pair in the table.

9. The method of claim 5, wherein the kerning adjustment value is a horizontal adjustment value, and further comprising determining that the horizontal kerning adjustment value is less than a kerning pair adjustment threshold.

10. The method of claim 5, wherein the frequency of occurrence threshold is a corpus frequency of occurrence threshold, the method further comprising:

determining a corpus frequency of occurrence of a character pair comprising a first character and a second character in a corpus of literature;

determining that the corpus frequency of occurrence is below the corpus frequency of occurrence threshold;

determining a first glyph identifier associated with the first character and a second glyph identifier associated with the second character;

determining a second kerning pair in the first set of kerning pairs comprises the third glyph identifier and the fourth glyph identifier; and removing the second kerning pair from the first set of kerning pairs.

11. The method of claim 5, further comprising:

determining that the first kerning pair comprises a first glyph identifier and a second glyph identifier;

determining a second kerning pair in the first set of kerning pairs that comprises the first glyph identifier and the second glyph identifier; and removing the second kerning pair from the first set of kerning pairs.

12. The method of claim 5, further comprising:

determining a set of desired kerning pairs;

determining a second kerning pair in the first set of kerning pairs that comprises a first glyph identifier and a second glyph identifier;

comparing the second kerning pair to the set of desired kerning pairs;

determining that the set of desired kerning pairs does not include a desired kerning pair comprising the first glyph identifier and the second glyph identifier; and removing the second kerning pair from the first set of kerning pairs.

13. The method of claim 5, wherein the frequency of occurrence threshold is a content frequency of occurrence threshold, the method further comprising:

receiving an indication to render a source text;

determining a content frequency of occurrence of a character pair in the source text;

determining that the content frequency of occurrence of the character pair is below the content frequency of occurrence threshold;

determining a first glyph identifier associated with a first character of the character pair and a second glyph identifier associated with a second character of the character pair;

determining a second kerning pair in the first set of kerning pairs that comprises the first glyph identifier and the second glyph identifier;

removing the second kerning pair from the first set of kerning pairs; and rendering the source text using the second font file.

14. The method of claim 5, further comprising:

receiving an indication to render a source text;

determining a second kerning pair of the first set of kerning pairs comprises a first glyph identifier and a second glyph identifier;

determining that the second kerning pair does not occur in the source text;

removing the second kerning pair from the first set of kerning pairs; and rendering the source text using the second font file.

15. A device, comprising:

a display;

at least one memory storing computer-executable instructions; and at least one processor communicatively coupled to the at least one memory and configured to access the at least one memory and execute the computer-executable instructions to:

receive a first font file for rendering text on the display, wherein the first font file comprises glyph data and a first set of kerning pairs, wherein a first kerning pair of the first set of kerning pairs comprises a kerning adjustment value and a frequency of occurrence for the first kerning pair;

determine whether the kerning adjustment value is below a kerning adjustment threshold;

determine whether the frequency of occurrence is below a frequency of occurrence threshold;

in response to a determination that the kerning adjustment value is greater than or equal to the kerning adjustment threshold, or that the frequency of occurrence is greater than or equal to the frequency of occurrence threshold, keep the first kerning pair in the first set of kerning pairs;

in response to a determination that the kerning adjustment value is less than the kerning adjustment threshold, and that the frequency of occurrence is less than the frequency of occurrence threshold, remove the first kerning pair from the first set of kerning pairs to generate a second set of kerning pairs; and generate a second font file for rendering text on the display, wherein the second font file comprises the glyph data and the second set of kerning pairs.

16. The device of claim 15, wherein the at least one processor is further configured to execute the computer-executable instructions to:

determine that a first number of kerning pairs in the first set of kerning pairs exceeds a threshold number of kerning pairs; and determine that a second number of kerning pairs in the second set of kerning pairs satisfies the threshold number of kerning pairs.

17. The device of claim 15, wherein the at least one processor is further configured to execute the computer-executable instructions to:

parse the first font file; and determine a table of the first font file that comprises the first set of kerning pairs;

wherein the at least one processor is configured to determine the table by determining a first glyph identifier associated with the first kerning pair, determining a second glyph identifier associated with the first kerning pair, and associating the kerning adjustment value with the first kerning pair; and wherein the kerning adjustment value comprises a horizontal adjustment, a vertical adjustment, or a diagonal adjustment.

18. The device of claim 17, wherein the at least one processor is further configured to execute the computer-executable instructions to remove the first kerning pair by disassociating the first glyph identifier or the second glyph identifier with the first kerning pair in the table.

19. The device of claim 15, wherein the frequency of occurrence threshold is a corpus frequency of occurrence threshold, and the at least one processor is further configured to execute the computer-executable instructions to:

determine a corpus frequency of occurrence of a character pair comprises a first character and a second character in a corpus of literature;

determine that the corpus frequency of occurrence is below the corpus frequency of occurrence threshold;

determine a first glyph identifier associated with the first character and a second glyph identifier associated with the second character;

determine a second kerning pair in the first set of kerning pairs comprises the third glyph identifier and the fourth glyph identifier; and remove the second kerning pair from the first set of kerning pairs.

20. The device of claim 15, wherein the frequency of occurrence threshold is a content frequency of occurrence threshold, and the at least one processor is further configured to execute the computer-executable instructions to:

receive an indication to render a source text;

determine a content frequency of occurrence of a character pair in the source text;

determine that the content frequency of occurrence of the character pair is below the content frequency of occurrence threshold;

determine a first glyph identifier associated with a first character of the character pair and a second glyph identifier associated with a second character of the character pair;

determine a second kerning pair in the first set of kerning pairs that comprises the first glyph identifier and the second glyph identifier;

remove the second kerning pair from the first set of kerning pairs; and
render the source text using the second font file.

\* \* \* \* \*